Patented Nov. 14, 1939

2,180,056

UNITED STATES PATENT OFFICE 2,180,056

PROCESS FOR MANUFACTURING GREEN CERAMIC COLORS

Gustav Jaeger, Neu-Isenburg, and Heinrich Diehl, Frankfort-on-the-Main, Germany, assignors to Deutsche Gold- und Silber-Scheide-Anstalt vormals Roessler, Frankfort-on-the-Main, Germany, a corporation of Germany No Drawing. Application February 1, 1937, Serial No. 123,554. In Germany February 3, 1936

6 Claims. (Cl. 106—36.2)

Object of our invention is a green ceramic coloring matter which is resistant to high temperatures and which, in consequence, can be utilized as an underglaze ceramic color.

We have found that by mixing beryllium oxide and chromium oxide and heating to high temperatures the mixture thus obtained a green coloring matter is obtained which has the property of a very great resistance against high temperatures. We have further found that a proportion of beryllium oxide to chromium oxide is most favorable for the production of the coloring matter which corresponds to approximately one molecule of beryllium oxide to about 0.5 to 0.2 molecule of chromium oxide. This means, in percentages, about 23 to 55% of chromium oxide to 77 to 45% of beryllium oxide. Depending upon the proportions of the components utilized products of different shades may be obtained. For instance, products with a low content of chromium oxide show shades of a delicate pale green whilst products with a higher content of chromium oxide possess bright green shades of great purity.

In the place of the oxides we can take other suitable compounds such as, for instance, beryllium hydroxide, beryllium nitrate, beryllium silicate, chromic acid, chromic nitrate, bichromates and the like. Also, mixtures of different beryllium compounds can be used. Different chromic compounds may be applied as well in accordance to our invention. Finally, we have found that natural products such as the mineral beryl may be used and that green coloring matters may be obtained from them which are of a very good quality indeed.

When pure oxides are utilized ignition products are obtained which may be used as coloring matters in the ceramic industry after they have been ground up in the usual way. When impure starting materials have been used for the production of the products, for instance, such as are capable of yielding by-products when the ignition process is carried out, we have found it advantageous to subject the ignition products after they have been ground to suitable measures for purification such as, for instance, to leaching, washing out with suitable liquids or the like.

To the mixtures of starting materials which contain beryllium and chromium compounds other substances may be added such as, for instance, aluminium oxide. These auxiliary substances may influence the properties of the resulting coloring matter, for instance, the price may be considerably lowered by their addition. The quantities and the kind of these products which may be mixed with the beryllium- and chromium oxide depend on the properties of the ceramic color aimed at and can easily be ascertained by preliminary experiment. It was impossible to foretell the effect of such additions since it was known that mixtures of chromium oxide and aluminium oxide on ignition yield products which possess when higher quantities of chromium oxide are used dirty green shades and when lower quantities of chromium oxide are applied shades of a reddish color. On the other hand, when beryllium oxide is used in conjunction with these additional oxides and suitable proportions are utilized coloring bodies of a clear green shade are obtained.

We have found that mixtures of the following proportions give very good results, the quantities given in these formulas being molecular proportions.

$$1.0\ BeO \cdot 0.05\ Cr_2O_3 \cdot 0.95\ Al_2O_3$$

to $$1.0\ BeO \cdot 0.4\ Cr_2O_3 \cdot 0.6\ Al_2O_3$$

These mixtures correspond to the following proportions in percentages:

|  | Percent |
|---|---|
| BeO | 19–17 |
| $Cr_2O_3$ | 5–41 |
| $Al_2O_3$ | 75–42 |

As firing temperatures come, for instance, into consideration temperatures of, for instance, 1100 to 1500° centigrade, in preference 1200–1450° C. The firing of the mixture can be carried out so that sintering takes place.

These ceramic colors produced according to our invention can be used in consequence of their great resistance against temperatures, as ceramic colors in the porcelain or earthenware manufacture, advantageously as underglaze colors for decorating china, earthenware or the like and show when fired very beautiful shade of green and of great luminescence.

Example 1

An intimate mixture of 50 grs. beryllium oxide finely ground and 50 grs. chromium oxide are fired at a temperature corresponding Seger cone SK 14 which is about 1420° C. After firing the mixture is finely ground and ready for use.

Example 2

A finely powdered mixture of 25 grs. beryllium oxide, 28 grs. chromium oxide and 72 grs. aluminium oxide is heated for 2 hours to about 1300° C.

Example 3

A finely ground mixture of 75 grs. beryllium oxide, 76 grs. potassium bichromate is heated to 1350° C., the product obtained is powdered, washed out and dried.

When ceramic colors are produced from beryllium oxide, chromium oxide and aluminium oxide according to our invention and when these products have been used as ceramic colors for the decoration of china or the like it was found that the effect when seen in daylight is very satisfactory, the color being a beautiful green varying from very pale to dark green. In artificial light, however, a discoloration takes place the color obtained appearing with a reddish tinge which latter might even prevail so that the color produced with the products according to our invention appears as a more or less distinct red.

We have found that we can counteract the discoloring effect of artificial light by adding to the mixture consisting of, or containing beryllium oxide, chromium oxide and aluminium oxide, oxides of the fourth and fifth group of the periodic system, such as for instance oxides of tin, zirconium, titanium, arsenic, antimony and silicon, either alone or in mixture of several of these elements. The oxide of silica has furnished particularly good results in this direction. Instead of the oxides other compounds of the said elements such as, for instance, silicates may be used.

The quantity of the additional substance depends on the quantity of aluminium oxide present and also on the other components, above all on the relative quantity of the aluminium oxide to the quantity of chromium oxide present. Generally speaking, when the quantity of aluminium oxide is increased the quantity of the additional substance has to be increased also. It will be necessary, on the other hand, to adapt the quantities of the additions in such a way that the property of the color finally obtained is not impaired.

According to our invention we have obtained very excellent results by igniting mixtures which contain oxides of beryllium, aluminium, chromium and silicon respectively in the following proportions: 3 molecules BeO, 0.001 to 0.9 molecule $Al_2O_3$, 0.1 to 0.4 molecule $Cr_2O_3$, 0.3 to 4.5 molecules $SiO_2$.

A product of especially good properties is obtained when 3 molecules of BeO are mixed with the following proportions of the other components: 0.4 to 0.72 molecule $Al_2O_3$, 0.12 to 0.24 molecule $Cr_2O_3$, 0.3 to 2.5 molecules $SiO_2$.

Furthermore we have found that the unfavorable influence upon the shade of the coloring can be counteracted by excluding when the mixture is ignited oxidising agents as far as possible such as, for instance, gaseous oxygen which might favor the oxidation into chromate of the chromium oxide.

The same effect can be obtained also by increasing the contents of beryllium oxide in the mixture. The temperatures at which the coloring matters according to our invention with the addition of oxides of the fourth and fifth group of the periodic system are kept in order to produce the proper coloring matter vary, for instance, from 1100 to 1500° centigrade and are advantageous between 1200 and 140° C., as stated above.

Example 4

A finely powdered mixture of 75 grs. beryllium oxide, 76 grs. potassium bichromate, 188 grs. ignited kaolin and 258 grs. silica is heated to 1350° C., the sintered product is powdered, washed and dried.

The possibility of counteracting the color changing effect by excluding oxidising conditions or by increasing the proportion of beryllium oxide is of special importance when soft glazes for earthenware such as contain lead, alkali metals or alkaline earth metals are used since these grazes favor the formation of chromates.

What we claim is:

1. Green ceramic color of great heat resistance which consists of a product obtained by heating beryllium oxide in conjunction with chromium oxide to tempertures ranging from about 1100 to about 1500° C.

2. Green ceramic color of great heat resistance which consists of a product obtained by heating beryllium oxide yielding compounds in conjunction with chromium oxide to temperatures ranging from about 1100 to about 1500° C.

3. Green ceramic color of great heat resistance which consists of a product obtained by heating beryllium nitrate in conjunction with chromium oxide to temperatures ranging from about 1100 to about 1500° C.

4. Green ceramic color of great heat resistance which consists of a product obtained by heating beryllium oxide in conjunction with chromium oxide yielding compounds to temperatures ranging from about 1100 to about 1500° C.

5. A green ceramic color of superior heat resistance which consists of the product obtained by heating together to a temperature within the range of about 1100 to about 1500° C. a beryllium compound selected from the group which consists of beryllium oxide and compounds of beryllium yielding beryllium oxide under the conditions of heating, and a chromium compound selected from the group which consists of chromium oxide and chromium compounds yielding chromium oxide under the conditions of heating.

6. A green ceramic color of superior heat resistance which consists of the product obtained by heating together a beryllium compound selected from the group which consists of beryllium oxide, beryllium hydroxide, beryllium nitrate, beryllium silicate, and beryl, and a chromium compound selected from the group which consists of chromium oxide, chromic acid, chromic nitrate, and bichromates, to a temperature within the range of about 1100 to about 1500° C.

GUSTAV JAEGER.
HEINRICH DIEHL.